July 19, 1960
I. A. MOSSOP ET AL
2,945,955
APPARATUS FOR DETECTING RADIOACTIVE
PARTICLE EMISSION
Filed Nov. 6, 1956
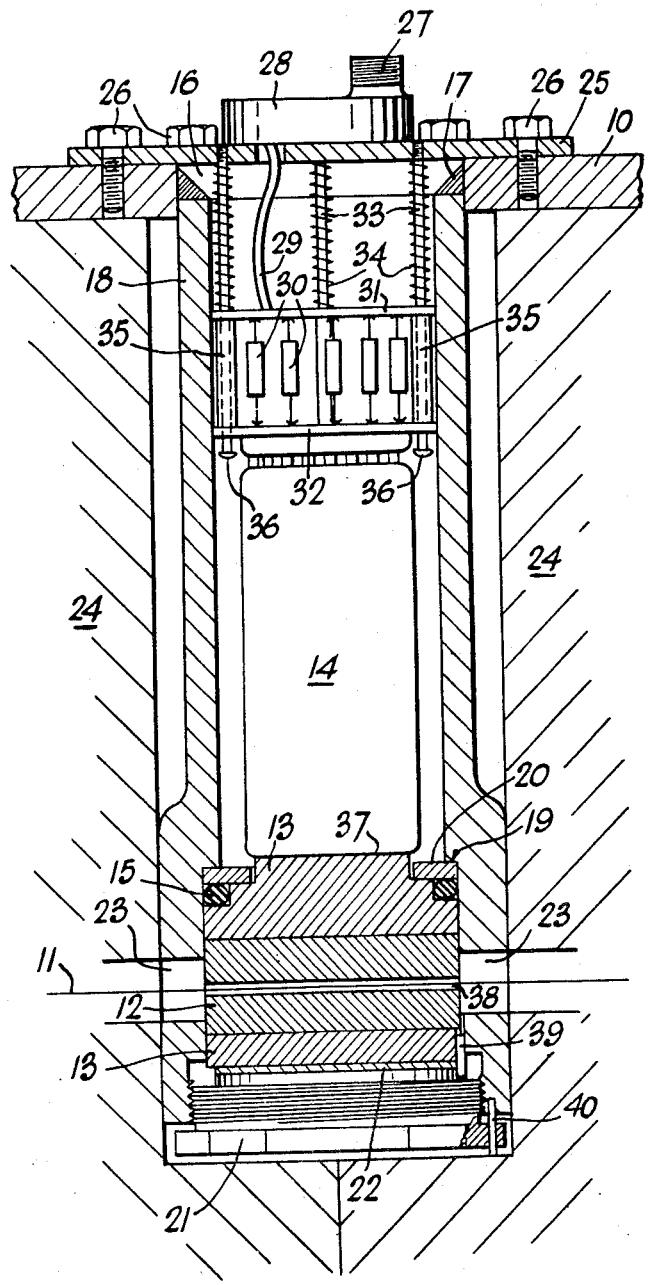

2,945,955
APPARATUS FOR DETECTING RADIOACTIVE PARTICLE EMISSION

Isaac Alan Mossop, Seascale, Cumberland, Philip Benson Fay, Egremont, Cumberland, and Gordon Packman, Risley, Warrington, England, assignors to The United Kingdom Atomic Energy Authority, London, England Filed Nov. 6, 1956, Ser. No. 620,638

Claims priority, application Great Britain Nov. 12, 1955

3 Claims. (Cl. 250—71.5)

This invention relates to apparatus for detecting radioactive particle emission and it is principally concerned with the detection of beta particles emitted from radioactive materials periodically deposited on the surface of a moving wire or tape in a pressurised apparatus so that the radioactivity of gas in that apparatus may be monitored.

Beta particle emission at atmospheric pressure from the surface of a moving wire has previously been detected by causing the wire to move through a straight tube eccentrically sealed within the volume of a Geiger counter. The beta particles penetrate the walls of the straight tube and activate the Geiger counter. Such a system may operate under a limited superatmospheric pressure (governed by the mechanical strength of the Geiger counter) but with high and continued counting rates a frequent replacement of the Geiger counter becomes necessary and this involves the letting down and building up of the pressure system. The alternative arrangement, of bringing the wire out and back through the walls of the pressurised apparatus introduces a gland problem.

The present invention provides an arrangement wherein the particle detector is arranged outside a pressurised apparatus whilst the wire or tape remains inside the apparatus.

According to the invention, apparatus for detecting radioactive particle emission from a wire or tape inside a vessel adapted to be pressurised comprises a scintillation-emitting particle sensitive phosphor shaped to embrace the wire or tape inside the vessel and a scintillation guide penetrating and sealed in the wall of the vessel for transmitting scintillations in the phosphor through said wall.

It is practical to make the phosphor of a size and shape so that it also acts as the scintillation guide. This is advantageous in that there are no problems of scintillation reflecting interfaces where the phosphor and scintillation guide join but such an arrangement can give rise to an unnecessarily large phosphor with a large unwanted background count and self absorption of wanted scintillations.

The existence of an interface between phosphor and guide can give rise to counting losses by reflections of the scintillations back into the phosphor and where an interface has been accepted the problem arises of minimising these losses. With this problem solved an optimum volume and shape of phosphor can then be selected. For counting beta particle emitted from a wire a cylindrical phosphor with the wire passing through an axial hole in the phosphor is very suitable.

In order to avoid losses at the interface between phosphor and guide the mating faces on both are highly polished and jointed with a suitable liquid. Preferably the joint is made with a liquid scintillation transmitting material capable of being subsequently hardened and the phosphor is shrink-fitted into the guide.

The outer surface of the guide may be given a white reflective coating.

One form of apparatus according to the invention will now be described with reference to the single figure of the accompanying drawing which is a sectional elevation.

The drawing shows generally the curved wall of a cylindrical pressure vessel 10 through which gas, radioactively contaminated, is passed so as to precipitate ionised radioactive particles on to a wire 11 under the influence of an electric field (in the manner shown for example in U.S. Patent 2,576,616). The wire 11 is then advanced through an axial hole 38 in a phosphor 12 (cylindrical about the horizontal axis) which is embedded in a scintillation guide 13 (cylindrical about the vertical axis) in contact with the window of a photomultiplier tube 14. The guide 13 has a seal 15 on the upper side of which atmospheric pressure exists and on the lower side a superatmospheric pressure exists. Thus it is seen that the wire 11, phosphor 12 and scintillation guide 13 experience the superatmospheric pressure whilst the photomultiplier tube only experiences atmospheric pressure and can be removed for maintenance and replacement without affecting the pressurised side of the apparatus.

Describing the apparatus now in more detail the pressure vessel 10 has an aperture 16 into which is welded at weld 17 a sleeve 18 which supports the phosphor 12 and scintillation guide 13. The scintillation guide is clamped against a shoulder 19 in the sleeve 18 through a thrust collar 20 and seal 15 by a nut 21. A disc 22 with a dead white upper surface is provided between the nut 21 and undersurface of the guide 13. The disc 22, being white acts as a reflector for scintillations in the phosphor. The sleeve 18 has opposed apertures 23. Shield members 24 fill the unused volume of the body 10 to reduce background counts at the phosphor 12 due to external gamma radiation penetrating to the phosphor. The tube 14 is supported by a light-sealing plate 25 attached to the body 10 by bolts 26. Electrical connection to the tube 14 is made at a plug 27 in a connector box 28 and cable 29 which couples with resistances 30 forming the resistance chain for the tube 14. The resistances 30 are supported between insulator plates 31, 32 which also serve to locate the tube 14 centrally in the sleeve 18. With the plate 25 removed from the body 10 the tube 14 is carried by the plates 31 and pins 33 fixed in the plate 25. Springs 34 force against the plate 31 and thence via collars 35 to the plate 32 and head 36 of the pins 33. When the tube 14 is inserted in the sleeve 18 and the plate 25 is bolted into place the springs 34 compress as shown in the drawing to keep the tube 14 in contact with the guide 13 along the plane 37.

The phosphor 12 is tetraphenylbutadiene in polystyrene and the guide 13 is methyl methacrylate. The phosphor 12 is made 0.002" oversize relative to the mating hole in the guide 13 and the mating surfaces between phosphor and guide are highly polished. The guide 13 is heated to 80° C., the phosphor is coated with Araldite (registered trademark) rosin "D" and then inserted in the guide 13. The assembled phosphor and guide are maintained at 80° C. for four hours to cure the resin and stress relieve the guide and then allowed to cool over a period of about one hour.

In the assembly of the apparatus shown in the drawings the sleeve 18 is welded in place. It is located at the holes 23 during welding by a rod penetrating the holes 23 and located relative to the ends of the vessel 10. The locating rod is then removed and washer 20, seal 15 and phosphor/guide combination are inserted. The phosphor is then correctly aligned relative to the holes 23 by a key 39, the washer 22 is inserted and the nut 21 tightened to make the pressure tight seal 15. The nut is locked in position with a pin 40. The shield members 24 are then put into position. The window of the tube 14, which is to make contact at plane 37 with the guide 13, is given a coating of silicone oil and then inserted into the sleeve 18 and the bolts 26 tightened.

What we claim is:

1. Apparatus for detecting radioactive particle emission from a wire or tape inside a pressure vessel, comprising a scintillation-emitting, particle-sensitive phosphor inside the vessel shaped to embrace the wire or tape and a scintillation guide surrounding the phosphor so that the phosphor is embedded in the scintillation guide, the mating surfaces of said phosphor and said scintillation guide being joined by a light-transparent, thermosetting resin, and said guide being sealed in the wall of the vessel.

2. Apparatus according to claim 1 wherein a photomultiplier tube is provided, supported by the vessel and spring-loaded into optical contact with the scintillation guide.

3. Apparatus for detecting radioactive particle emission from a wire or tape inside a pressure vessel, comprising a cylindrical scintillation-emitting, particle-sensitive phosphor defining an axial hole for the passage of the wire or tape and a cylindrical scintillation guide surrounding the phosphor with its axis perpendicular to the axis of the phosphor so that the phosphor is embedded in the scintillation guide, the mating surfaces of said phosphor and said scintillation guide being joined by a light-transparent, thermo-setting resin, and said guide being sealed in the wall of the pressure vessel.

References Cited in the file of this patent

UNITED STATES PATENTS

| 2,576,616 | Livingston et al. | Nov. 27, 1951 |
| 2,711,482 | Goodman | June 21, 1955 |
| 2,727,154 | Goldsworthy | Dec. 13, 1955 |
| 2,751,505 | Anderson | June 19, 1956 |
| 2,756,343 | Johnson | July 24, 1956 |

OTHER REFERENCES

The Role of Liquid Scintillators in Nuclear Medicine, by Hayes, F. N., et al., from Proceedings of the International Conference on the Peaceful Uses of Atomic Energy, published by The United Nations, vol. 14, pages 182 to 187; August 1955.